US009645250B2

(12) United States Patent
Zeng et al.

(10) Patent No.: US 9,645,250 B2
(45) Date of Patent: May 9, 2017

(54) FAIL OPERATIONAL VEHICLE SPEED ESTIMATION THROUGH DATA FUSION OF 6-DOF IMU, GPS, AND RADAR

(71) Applicant: GM GLOBAL TECHNOLOGY OPERATIONS LLC, Detroit, MI (US)

(72) Inventors: Shuqing Zeng, Sterling Heights, MI (US); David M. Sidlosky, Beverly Hills, MI (US); David W. Doerr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 14/680,894

(22) Filed: Apr. 7, 2015

(65) Prior Publication Data

US 2016/0299234 A1     Oct. 13, 2016

(51) Int. Cl.
*G01S 19/52*     (2010.01)
*G01P 3/00*      (2006.01)
(Continued)

(52) U.S. Cl.
CPC .............. *G01S 19/52* (2013.01); *G01S 7/42* (2013.01); *G01S 13/588* (2013.01); *G01S 13/86* (2013.01); *G01S 19/42* (2013.01); *G08G 1/0104* (2013.01)

(58) Field of Classification Search
USPC .............. 701/32.9, 70, 93, 28, 36; 340/440; 702/150–153, 141–142; 700/258;
(Continued)

(56) References Cited

U.S. PATENT DOCUMENTS 6,718,248 B2 * 4/2004 Lu ...................... B60G 17/0162
340/440
8,855,848 B2 * 10/2014 Zeng .................... B60W 40/105
701/28

(Continued)

FOREIGN PATENT DOCUMENTS

| CN | 101320089 A | * 12/2008 | .......... B60W 40/105 |
| DE | 102008026397 A1 | * 1/2009 | .......... B60W 40/105 |
| WO | WO 2014145409 A1 | * 9/2014 | .......... G01C 15/00 |

OTHER PUBLICATIONS

Plane-based calibration for multibeam sonar mounting angles; Chau-Chang Wang; Kuang-Che Yang; Sen-Wen Shyue; Liu-Huang Chon-Lon; Oceans 2003. Proceedings; Year: 2003, vol. 2; p. 987 vol. 2, DOI: 10.1109/OCEANS.2003.178465.*

(Continued)

*Primary Examiner* — Cuong H Nguyen
(74) *Attorney, Agent, or Firm* — John A. Miller; Miller IP Group, PLC

(57) ABSTRACT

A method for providing redundant vehicle speed estimation. The method includes providing sensor output signals from a plurality of primary sensors and providing inertial measurement signals from an inertial measurement unit. The method also includes estimating the vehicle speed in a primary module using the primary sensor signals, and buffering the estimated vehicle speed values from the primary module for a predetermined period of time. The method further includes determining that one or more of the primary sensors or the primary module has failed, and if so, estimating the vehicle speed in a secondary module using the buffered vehicle speed values and the inertial measurement signals. The method can use GPS signal data and/or range data from static objects to improve the estimated vehicle speed in the secondary module if they are available.

19 Claims, 3 Drawing Sheets

(51) Int. Cl.
*G01S 19/42* (2010.01)
*G01S 7/42* (2006.01)
*G01S 13/58* (2006.01)
*G01S 13/86* (2006.01)
*G08G 1/01* (2006.01)

(58) Field of Classification Search
USPC .......................................................... 348/140
See application file for complete search history.

(56) References Cited

U.S. PATENT DOCUMENTS

| | | | | |
|---|---|---|---|---|
| 9,228,836 | B2 * | 1/2016 | Girod et al. ............ | G01C 15/00 |
| 2003/0236606 | A1 * | 12/2003 | Lu ....................... | B60G 17/0162 701/70 |
| 2010/0017128 | A1 * | 1/2010 | Zeng .................... | B60W 40/105 701/301 |
| 2014/0278206 | A1 * | 9/2014 | Girod ..................... | G01C 15/00 702/141 |

OTHER PUBLICATIONS

A strategy for selecting optimal vergence pose and calibration patterns for stereo-vision calibration; K S Chidanand Kumar 2015 IEEE International Conference on Computer Graphics, Vision and Information Security (CGVIS); Year: 2015 pp. 44-48, DOI: 10.1109/CGVIS.2015.7449890.*

Estimating desired yaw rate and control strategy analysis on developed air ESC system for performance evaluation; Seunghwan Chung; Hyeongcheol Lee; Control, Automation and Systems (ICCAS), 2015 15th International Conference on; Year: 2015 pp. 2005-2010, DOI: 10.1109/ICCAS.2015.7364697.*

Design and simulation of an innovative micro-magnetic module with dual-function of actuator and sensor; Nan-Chyuan Tsai; Bing-Hong Liou; Chih-Che Lin; 2009 IEEE/ASME International Conference on Advanced Intelligent Mechatronics; Year: 2009 pp. 1903-1908, DOI: 10.1109/AIM.2009.5229767.*

Real time vision for intelligent vehicles; D. M. Gavrila; U. Franke; C. Wohler; S. Gorzig; IEEE Instrumentation & Measurement Magazine; Year: 2001, vol. 4, Issue: 2; pp. 22-27, DOI: 10.1109/5289.930982.*

Experimental investigation of axisymmetric turbulent boundary layers; Kimberly Cipolla; William Keith; Alia Foley; Oceans'11 MTS/IEEE KONA; Year: 2011; pp. 1-6.*

SPIV measurements of axisymmetric turbulent boundary layers; Kimberly Cipolla; William Keith; Alia Foley; Oceans 2010 MTS/IEEE Seattle; Year: 2010; pp. 1-7, DOI: 10.1109/OCEANS.2010.5663848.*

Song, Xiaofeng F. et al. U.S. Appl. No. 14/614,164, filed Feb. 4, 2015, entitled "Fail Operational Vehicle Speed Estimation Through Data Fusion of 6-DOF IMU, GPS, and Radar".

* cited by examiner

FAIL OPERATIONAL VEHICLE SPEED ESTIMATION THROUGH DATA FUSION OF 6-DOF IMU, GPS, AND RADAR

BACKGROUND OF THE INVENTION

Field of the Invention

This invention relates generally to a system and method for estimating vehicle speed and, more particularly, to a system and method for a secondary or redundant estimation of vehicle speed in the event that a primary speed estimation module fails, where a secondary speed estimation module employs sensor inputs from a 6 degree-of-freedom (DOF) inertial measurement unit (IMU), a GPS receiver and range sensors.

Discussion of the Related Art

Vehicles are becoming more autonomous or cognitive with the goal being a completely autonomously driven vehicle, i.e., vehicles that are able to provide driving control with minimal or no driver intervention. Adaptive cruise control systems have been available for a number of years where not only does the system maintain a set speed, but also will automatically slow the vehicle down in the event that a slower moving vehicle is detected in front of the subject vehicle. Vehicle control systems currently exist that include autonomous parking where the vehicle will automatically provide the steering control for parking the vehicle. Also, control systems exist that may intervene if the driver makes harsh steering changes that may affect vehicle stability and lane centering capabilities, where the vehicle system attempts to maintain the vehicle near the center of the travel lane. Future vehicles will likely employ autonomous systems for lane changing, passing, turns away from traffic, turns into traffic, merging into traffic, passing through or turning at intersections, etc.

Various active safety control systems, driver assist systems and autonomous driving operations on vehicles, such as electronic stability control (ECS), adaptive cruise control (ACC), lane keeping (LK), lane changing (LC), etc., require highly robust and precise modules for estimating various vehicle dynamics. Such modules are necessary to provide knowledge of the vehicle position and velocity to control the vehicle.

Active safety control for the systems discussed above, and others, rely on accurate vehicle speed estimation for proper performance. Currently, these types of proposed systems rely on wheel speed sensors and other vehicle kinematic inputs to provide the vehicle speed estimation. However, sometimes sensors and control modules that determine vehicle speed fail or operate incorrectly, where loss of vehicle speed could be serious. Certain automotive safety requirements, such as ASIL-D, require redundant vehicle speed estimation processes in the event of failure of the primary estimation processor. For example, for those systems that require active control, the control systems are required to provide accurate speed estimation for five seconds after the failure event so as to give the driver time to take control of the vehicle. It would be desirable to provide such redundant speed estimation processes using existing hardware on the vehicle to reduce vehicle cost.

SUMMARY OF THE INVENTION

The present disclosure describes a system and method for providing redundant vehicle speed estimation. The method includes providing sensor output signals from a plurality of primary sensors and providing inertial measurement signals from an inertial measurement unit. The method also includes estimating the vehicle speed in a primary module using the primary sensor signals, and buffering the estimated vehicle speed values from the primary module for a predetermined period of time. The method further includes determining that one or more of the primary sensors or the primary module has failed, and if so, estimating the vehicle speed in a secondary module using the buffered vehicle speed values and the inertial measurement signals. The method can use GPS signal data and/or velocity data provided by range sensors, such as radar, lidar and vision systems, from static objects to improve the estimated vehicle speed in the secondary module if they are available.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a secondary technique for estimating vehicle speed in the event of primary vehicle speed estimation failure is merely exemplary in nature, and is in no way intended to limit the invention or its applications or uses. For example, as discussed, the system and method has particular application for estimating vehicle speed. However, as will be appreciated by those skilled in the art, the system and method may have application for other mobile platforms, such as on trains, machines, tractors, boats, recreation vehicles, etc.

As will be discussed in detail below, the present invention proposes a secondary system and method for estimating vehicle speed in the event that the primary system for estimating vehicle speed fails. In one embodiment, the secondary speed estimation system has application for providing the vehicle speed estimation for a certain period of time, such as five seconds, after the primary technique has failed as required by automotive standards for vehicle autonomous or semi-autonomous driving control systems to allow time for the vehicle driver to take control of the vehicle. The secondary speed estimation technique employs data from existing vehicle sensors that are not used to determine the vehicle speed in the primary speed estimation system. In one embodiment, the secondary speed estimation system employs signals from a 6-DOF IMU, a GPS receiver and range sensors, such as radar, lidar, vision systems, etc., that can be fused together to determine vehicle speed.

During the time that the primary speed estimation system is operational, the calculated vehicle speed is buffered for a number of sample points, where the buffered speed information is continually updated for each sample period. The 6-DOF IMU sensor data is used to extrapolate vehicle speed for some period of time after failure of the primary speed estimation system by using the buffered vehicle speed data calculated by the primary system. This data from the 6-DOF IMU can be used in combination with the GPS signals if they are available. Further, velocity measurement data from stationary objects around the vehicle can be used in combination with one or both of the extrapolated 6-DOF IUM data and the GPS signals.

Figure 1:
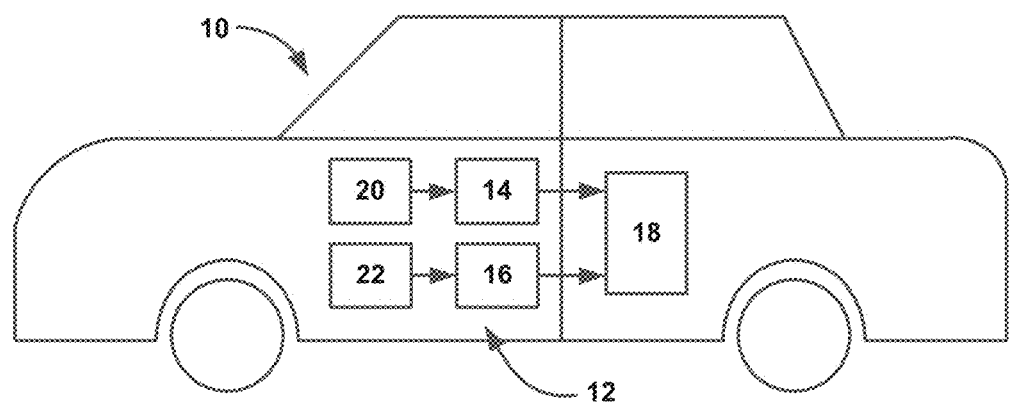
FIG. 1 is simple illustration of a vehicle including a redundant system for estimating vehicle speed.

FIG. 1 is a simplified illustration of a vehicle 10 including a redundant vehicle speed estimation system 12. The system 12 includes a primary vehicle speed estimation module 14 and a secondary vehicle speed estimation module 16 that are each able to generate estimates of vehicle lateral and longitudinal speeds. The vehicle lateral and longitudinal speeds generated by the modules 14 and 16 are provided to one or more controllers 18 that control some aspect of the vehicle, such as autonomous driving systems, active safety control system, stability control system, etc. The primary module 14 receives signals from a number of kinematic sensors, represented generally at box 20, that it uses to estimate the vehicle speed. Such sensors may include wheel speed sensors, steering wheel angle sensor, yaw rate sensor, longitudinal and lateral acceleration sensors, etc. If one or more of these sensors fails, or the module 14 itself fails, then the system 12 will detect that failure, and use the vehicle speed estimation signal from the secondary module 16 instead of the primary module 14. The secondary module 16 uses different sensors than the primary module 14, such as a 6-DOF IMU, a GPS receiver, range sensors, etc., represented generally at box 22.

Figure 2:
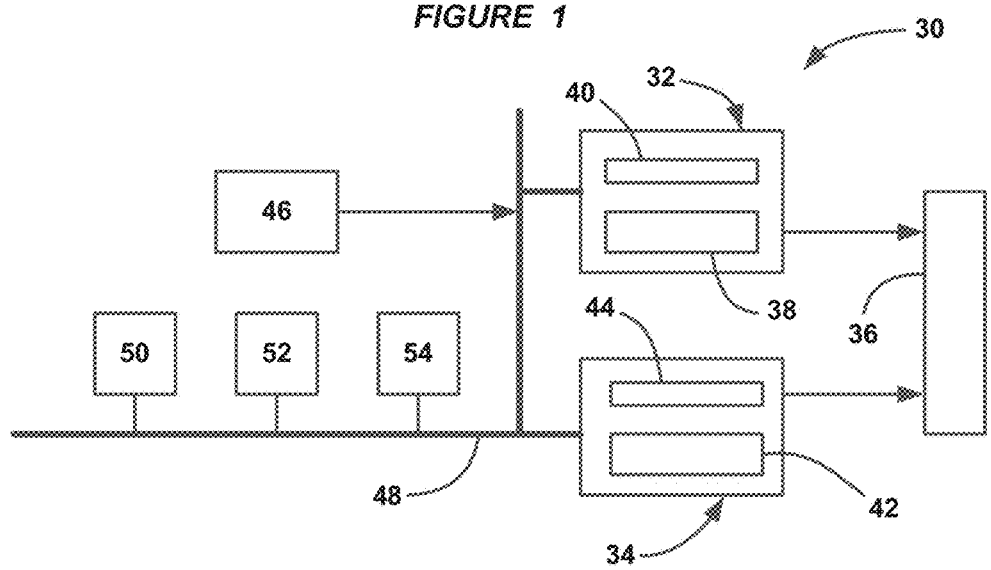
FIG. 2 is a block diagram of a control system including a primary module for estimating vehicle speed and a secondary module for estimating vehicle speed.

FIG. 2 is a schematic block diagram of a vehicle speed estimation system 30 similar to the system 12. The system 30 includes a primary vehicle speed estimation module 32 and a secondary vehicle speed estimation module 34 that provide estimated vehicle lateral and longitudinal speed signals to an active safety controller 36. The module 32 includes a primary function processor 38 that calculates the vehicle speed estimation signals and a fail-safe decider processor 40 that determines whether any part of the module 32 or its inputs has failed. Likewise, the secondary module 34 includes a secondary function processor 42 that calculates the vehicle speed estimation signal, which is only used if the primary module 32 fails. The secondary module 34 also includes a fail-safe decider processor 44 that determines whether the secondary module 34 is operating properly. The primary module 32 and the secondary module 34 receive sensor signals from a vehicle communications channel or bus 48. A number of sensors 46, such as wheel speed sensors, steering angle sensors, yaw rate sensors, longitudinal and latitude acceleration sensors, etc., provide sensor signals on the bus 48 that are obtained by the primary module 32. Further, the system 30 includes a 6-DOF IMU 50, a GPS receiver 52 and range sensors 54 that also put their signals onto the communications bus 48 and which are available to the secondary module 34.

The secondary module 34 also receives the speed signals from the primary function processor 38 and buffers those speed signals for at least some rolling period of time, such as five seconds. If a fault in the primary module 32 is detected, then the secondary module 34 reads the buffered data and extrapolates that data using angular rate and acceleration signals from the 6-DOF IMU 50 to provide the vehicle speed estimation. The 6-DOF IMU 50 is a well known sensor available on certain vehicles that provides six rate of change measurements, particularly, angular rate measurements to of vehicle roll, pitch and yaw, and acceleration measurements f of longitudinal acceleration, lateral acceleration and up/down acceleration. The extrapolation of the vehicle speed using the stored speed values and the 6-DOF IMU data in the secondary module 34 can be corrected or augmented using the GPS data from the GPS receiver 52 and/or the data from the range sensors 54 that detect stationary objects if available, where the range rate of change of the distance between the vehicle and the detected stationary object can be used to help determine the vehicle speed. If the primary module 32 recovers from the failure or fault, operation of the system 30 transitions back to the primary module 32, where the state variables of the primary module 32, such as vehicle longitudinal speed, vehicle lateral speed, roll angle and pitch angle, are initialized with the latest state variables from the secondary module 34 over the communications bus 48.

The following discussion describes how the rate change data from the 6-DOF IMU 50 can be used to predict the vehicle speed for some period of time after the primary module 32 has failed using the buffered vehicle speed data. The vehicle kinematics of the ordinary differential equation (ODE) for vehicle speed in the vehicle body frame b is defined as:

$$\dot{v}^b = -\Omega v^b + R_a^b g^a + f^b, \quad (1)$$

where $v^b$ is the vehicle velocity at the center of the IMU 50 in the vehicle body frame b, which corresponds to vehicle longitudinal, lateral and up/down speed, i.e., $v^b=[v_{lon},v_{lat},v_{up}]^T$, where it is assumed that the wheels of the vehicle always touch the ground, particularly a "virtual" measurement $v_{up}=0$ in Kalman filtering; $\Omega$ is a skew symmetric matrix of the angular velocity $\omega$ in the b-frame; $g^a$ is the Earth gravitational vector in the inertia frame a, specifically $(0,0,-9.80665)^T$ m/s$^2$; $R_a^b$ is the rotation matrix from the b-frame to the inertia frame a; $f^b$ is the vehicle acceleration measured by accelerometers in the b-frame (IMU data), and $\omega$ is the angular rates measured by gyros in the b-frame (IMU data), and where the skew matrix $\Omega$ is:

$$\Omega = [\omega \ x] = \begin{pmatrix} 0 & -\dot{\psi} & \dot{\theta} \\ \dot{\psi} & 0 & -\dot{\phi} \\ -\dot{\theta} & \dot{\phi} & 0 \end{pmatrix}, \quad (2)$$

and the angular rates $\omega$ are:

$$\omega = (\dot{\phi},\dot{\theta},\dot{\psi})^T, \quad (3)$$

where $\phi$ is the roll angle, $\theta$ is the pitch angle and $\psi$ is the yaw angle.

If the value $v^a$ is the velocity of the vehicle's center of gravity (CG) in the inertial frame (a-frame), by Newton's laws:

$$\dot{v}^a = g^a + f^a \quad (4)$$

since:

$$v^a = R_b^a v^b, \quad (5)$$

$$\dot{v}^a = R_b^a \dot{v}^b = R_b^a \dot{v}^b + R_b^a \Omega v^b = g^a + f^a, \quad (6)$$

Note that the property of the rotation matrix $R_a^b$ and the acceleration vector observed in the vehicle body frame.

Multiplying equation (6) by the rotation matrix $R_a^b$ derives the ODE of the vehicle speed in vehicle body frame b.

Figure 3:
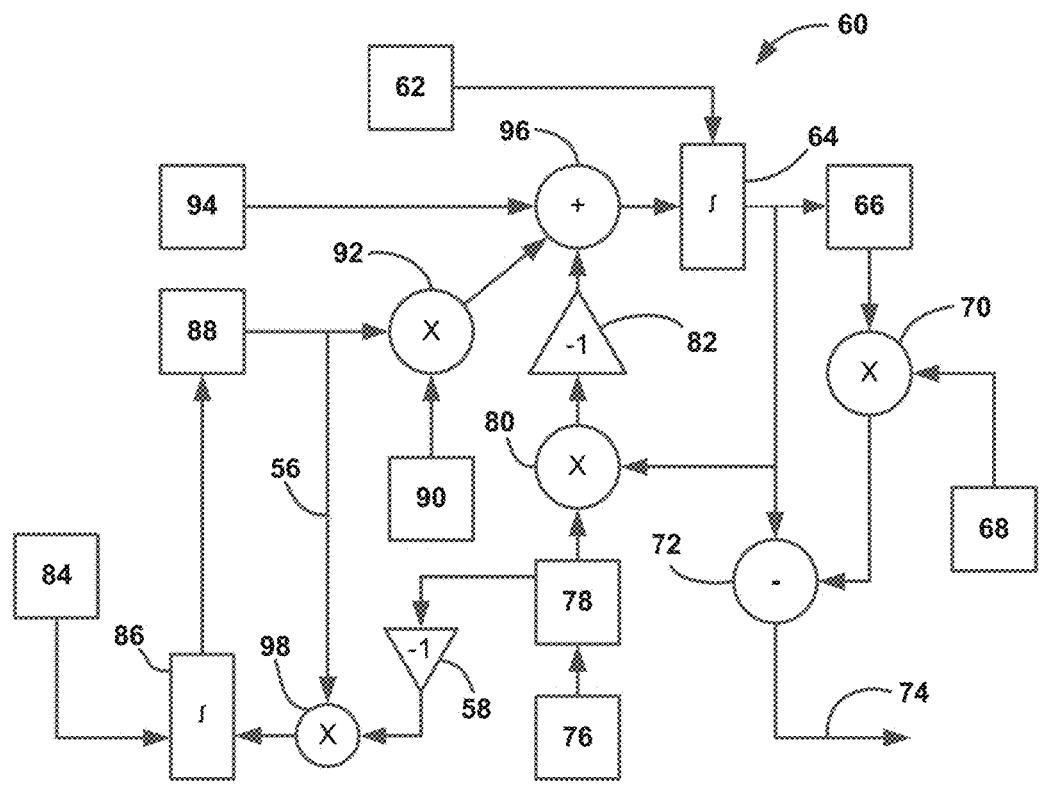
FIG. 3 is a flow diagram showing vehicle kinematics being used for estimating vehicle speed.

FIG. 3 is a flow diagram 60 showing how equation (1) is used to predict the vehicle speed value $v^b$. The last buffered vehicle speed value $v_0^b$ from the primary module 32 is provided at box 62, which has three components, namely, the longitudinal speed $\hat{v}_{lon}$, the lateral speed $\hat{v}_{lat}$ and the vehicle up/down speed $v_{up}$ as:

$$v_0^b = [\hat{v}_{lon}, \hat{v}_{lat}, 0]^T \quad (7)$$

The vehicle velocity in the body frame is integrated at box 64 to obtain the vehicle speed value $v^b$. The speed value $v^b$ is used to obtain the up-speed error $-v_{up}$ at box 66, which is multiplied by a Kalman filtering gain K provided at box 68 in a multiplier 70 to obtain $-Kv_{up}$. The filtered up-speed error $-Kv_{up}$ is then subtracted from the vehicle speed value $v^b$ in a subtractor 72 to obtain the estimated longitudinal and lateral vehicle speed signal on line 74 as the output from the secondary function processor 42.

A discussion of how the speed value $\dot{v}^b$ is obtained is provided as follows. The pitch, roll and yaw angle rates $\omega$ from the 6-DOF IMU 50 are provided at box 76, and are used to calculate the skew matrix $\Omega$ at box 78. The skew matrix $\Omega$ is multiplied by the vehicle speed value $v^b$ in multiplier 80 and is inverted by inverter 82 to obtain the value $-\Omega v^b$ as the first component of equation (1).

Figure 4:
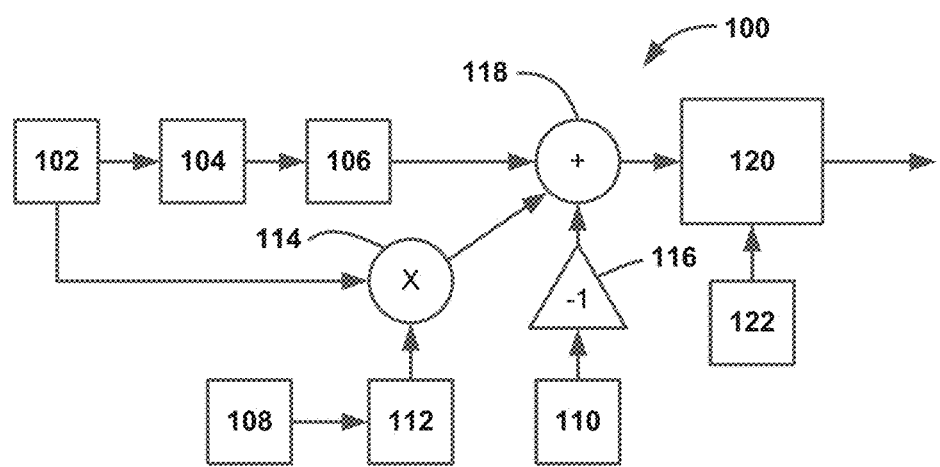
FIG. 4 is a flow diagram showing a process for estimating vehicle attitude prior to primary module failure.

The prediction of the vehicle speed by the secondary function processor 42 in the secondary module 34 requires an initial value of the vehicle attitude, i.e., roll, pitch and yaw, which determines the rotation matrix $R_a^b$ from the inertial coordinate system (a-frame) to the vehicle coordinate system (b-frame). In this example, the value $R_a^b g^a$ is invariant to azimuth rotation, and thus only the roll and pitch angles of the vehicle are needed, where the yaw angle is set to zero. For a stationary vehicle, the roll and pitch attitude of the vehicle can be computed from two-dimensional angles between the gravitational vector and the IMU measured acceleration. However, for a moving vehicle, the attitude for roll and pitch can be determined using the vehicle speed vector value $v^b$ from the primary module 32. The skew matrix $\Omega$ from the box 78 is inverted by an inverter 58 to obtain the inverse of the skew matrix $-\Omega$, which is multiplied by an estimate of the rotation matrix $R_a^b$ provided on line 56 in a multiplier 98 to obtain the value $-\Omega R_a^b$. The last buffered rotation matrix $R_a^b$ provided at box 84 before the detected fault of the primary module 32 and the value $-\Omega R_a^b$ from the multiplier 98 are provided to an integral operator 86 to generate a new rotation matrix $\hat{R}_a^b$. FIG. 4 and the discussion below show how these buffered rotation matrices $R_a^b$ are determined when the primary module 32 is functioning.

The space formed by rotation matrices is non-Euclidean, and thus special care is needed when handling vehicle attitude estimations. For example, the value $\hat{R}_a^b$ from the integral operator 86 may not be a rotation matrix. A singular value decomposition (SVD) projection is needed to provide normalization of the value $\hat{R}_a^b$ to identify it as a rotation matrix. SVD matrices U, S and V are computed such that:

$$USV^T = \hat{R}_a^b \quad (8)$$

$$C = \begin{pmatrix} 1 & 0 & 0 \\ 0 & 1 & 0 \\ 0 & 0 & \det(UV^T) \end{pmatrix}. \quad (9)$$

The normalized rotation matrix $R_a^b$ is obtained at box 88 by computing:

$$R_a^b = USV^T. \quad (10)$$

The vehicle attitude including the roll $\phi$, pitch $\theta$, and yaw $\psi$ angles is obtained from the rotation matrix $R_a^b$. The vehicle coordinate system (b-frame) is attached to the body of the vehicle, and the a-frame is the inertia coordinate system.

The rotation matrix $R_b^a$ can be expressed by three Euler angles as:

$$\theta = (\phi, \theta, \psi)^T. \quad (11)$$

The rotation matrix $R_a^b$ from the a-frame to the b-frame is provided as:

$$R_a^b = R_x(-\phi)R_y(-\theta)R_z(-\psi) = \begin{pmatrix} c_\theta c_\psi & c_\theta s_\psi & -s_\theta \\ c_\psi s_\phi s_\theta - c_\phi s_\psi & c_\phi c_\psi + s_\phi s_\theta s_\psi & c_\theta s_\phi \\ s_\phi s_\psi + c_\phi c_\psi s_\theta & c_\psi s_\phi + c_\phi s_\theta s_\psi & c_\phi c_\theta \end{pmatrix}, \quad (12)$$

where $c_\theta = \cos(\theta)$ and $s_\theta = \sin(\theta)$.

The derivative of the rotation matrix $R_b^a$ from the b-frame to the a-frame is determined as follows. Considering infinitesimal angles $\delta\theta = (\delta\phi, \delta\theta, \delta\psi)^T$ for the roll $\phi$, pitch $\theta$ and yaw $\psi$ motion of the vehicle, the corresponding rotation matrix R can be approximated by $R_b^a \approx I_3 + \Delta\Theta$, where $\Delta\Theta = [\delta\theta x]$ is the skew symmetric matrix representation of the rotation angles $\theta_b^a$ as:

$$\Delta\Theta = [\delta\theta x] = \begin{pmatrix} 0 & -\delta\psi & \delta\theta \\ \delta\psi & 0 & -\delta\phi \\ -\delta\theta & \delta\phi & 0 \end{pmatrix}, \quad (13)$$

where x represents a skew symmetric matrix operator, i.e., $axb \equiv [ax]b$.

At time t, a vector p in the b-frame can be expressed in the a-frame as $q(t) = R_b^a(t)p$. Now consider at time $t+\Delta t$ that:

$$q(t+\Delta t) = R_b^a(t+\Delta t)p = (I_3 + \Delta\Theta)R_b^a(t)p. \quad (14)$$

The time derivative of the rotation matrix $R_b^a$ is defined as:

$$\dot{R}_b^a(t) = \lim_{\Delta t \to 0} \frac{R_b^a(t+\Delta t) - R_b^a(t)}{\Delta t} \quad (15)$$
$$= \lim_{\Delta t \to 0} \frac{(I_3 + \Delta\Theta)R_b^a - R_b^a(t)}{\Delta t}$$
$$= \lim_{\Delta t \to 0} \frac{\Delta\Theta}{\Delta t} R_b^a(t) = \Omega R_b^a(t),$$

where $\Omega = \lim_{\Delta t \to 0} \frac{\Delta\Theta}{\Delta t}$ is the skew symmetric matrix angular rate $\omega = (\dot{\phi}, \dot{\theta}, \dot{\psi})^T$, i.e., $\Omega = [\omega x]$. Note that equation (15) is equivalent to the vehicle attitude:

$$\dot{\theta}(t) = \omega. \quad (16)$$

The rotation matrix $R_a^b$ from the box 88 and the gravitational vector $g^a$ from box 90 are multiplied by multiplier 92 to obtain the second component of equation (1), specifically $R_a^b g^a$. The three acceleration values $f^b$ from the 6-DOF IMU 50 are provided at box 94 for the third component of equation (1) and all of the components $-\Omega v^b$, $R_a^b$, $g^a$ and $f^b$ are added together by adder 96 to obtain the velocity value $\dot{v}^b$ that is sent to the integral box 64.

FIG. 4 is a flow diagram 100 showing a process for determining or estimating the vehicle attitude θ prior to failure using the speed vector $v^b$ provided by the primary module 32 at box 102. The speed vector $v^b$ is low-pass filtered at box 104 and its rate of change is provided by derivation box 106 to obtain the rate change of the speed vector value $\dot{v}^b$. The IMU angle rates ω are provided at box 108 and the IMU acceleration rates $f^b$ are provided at box 110. The skew matrix Ω is calculated at box 112 using the angle rates ω the same as in the box 78 described above. The skew matrix Ω is then multiplied by the speed value $v^b$ in multiplier 114 to obtain the value $\Omega v^b$. The acceleration rates $f^b$ are inverted by inverter 116 and the values $\dot{v}^b$, $\Omega v^b$ and $-f^b$ are added by adder 118 to obtain $\dot{v}^b + \Omega v^b - f^b$ from which the rotation matrix $R_a^b$ is estimated at box 120 using the roll-pitch angle β and the gravitational vector $g^a$ from box 122 as follows:

$$R_a^b g^a = \beta, \quad (17)$$

where:

$$\beta = \dot{v}^b + \Omega v^b - f^b. \quad (18)$$

The SVD matrices U, S and V are computed as:

$$USV^T = \beta(g^a)^T, \quad (19)$$

where:

$$C = \begin{pmatrix} 1 & 0 & 0 \\ 0 & 1 & 0 \\ 0 & 0 & \det(UV^T) \end{pmatrix}. \quad (20)$$

The estimate for the rotation matrix $R_a^b$ is:

$$R_e = UCV^T. \quad (21)$$

The vehicle attitude θ for the roll angle φ and the pitch angle θ is computed as:

$$\phi = -\sin^{-1}(R(1,3)), \quad (22)$$

$$\theta = \sin^{-1}\left(\frac{R(2,3)}{\cos(\theta)}\right). \quad (23)$$

As mentioned above, if the GPS data from the GPS receiver 52 is available it can be used to improve the predicted vehicle speed in combination with the data provided by the IMU 50 because the prediction performance degrades as errors are accumulated. The GPS signal is used as the measurement of the vehicle's longitudinal speed as $v_{GPS} = \sqrt{v_{lon}^2 + v_{lat}^2} + \epsilon$, where $v_{lon}$ is the vehicle longitudinal speed, $v_{lat}$ is the vehicle lateral speed, and E is the zero-mean Gaussian distributed error. A Kalman-Bucy filter is applied to correct vehicle velocity estimation when the GPS corrections occur when new GPS data arrives and signal reception is above a predetermined signal-to-noise ratio.

Figure 5:
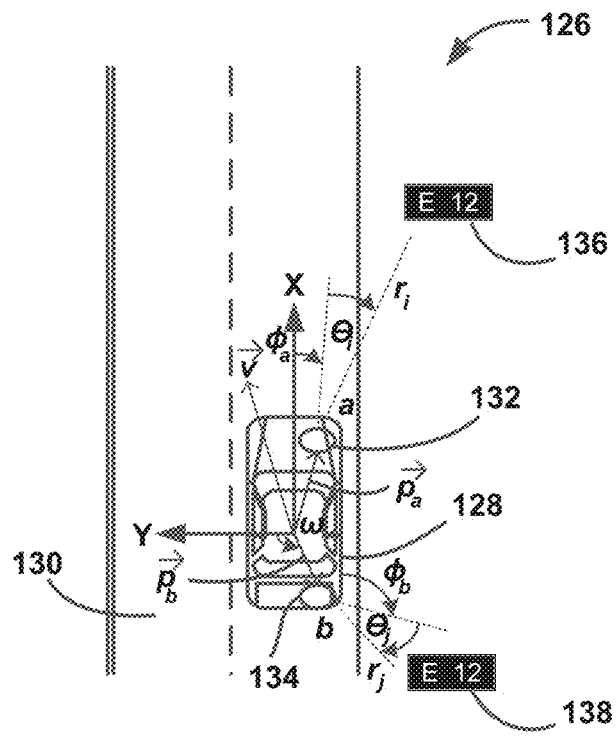
FIG. 5 is an illustration of a vehicle traveling along a roadway showing variables employed in a technique for improving estimation of vehicle speed using range data.

Also, as mentioned above, velocity data from range sensors can be used to improve the vehicle speed estimator. As an exemplar embodiment, the correction using the radar data is discussed below with reference to FIG. 5 showing an illustration 126 of a vehicle 128 traveling along a roadway 130. The vehicle 128 includes a front radar sensor 132 and a rear radar sensor 134 that detect objects along the roadway 132, such as road signs 136 and 138, respectively. Using the state variables of vehicle longitudinal and lateral speed $v_H = (v_{lon}, v_{lat})^T$, vehicle yaw rate from the IMU 50, a two-dimensional skew symmetric matrix $[\psi x]$, the i-th object detected by the radar sensor 132 located at point $p_i$ in the vehicle frame, range rate $\dot{r}_i$, the j-th object detected by the radar sensor 134 located at point $p_j$ in the vehicle frame, and the range rate $\dot{r}_j$, two measurement equations can be obtained as:

$$\dot{r}_i = -\frac{([\psi x] p_i + v_H)^T (p_i - p_a)}{\|p_i - p_a\|} + \varepsilon_i, \quad (24)$$

$$\dot{r}_j = -\frac{([\psi x] p_j + v_H)^T (p_j - p_b)}{\|p_j - p_b\|} + \varepsilon_j, \quad (25)$$

where $\epsilon_i$ and $\epsilon_j$ are zero-mean Gaussian distributed error terms introduced by radar Doppler measurements. Therefore, a Kalman-Bucy filter can be designed to correct vehicle speed prediction based on the measurement equations.

Figure 6:
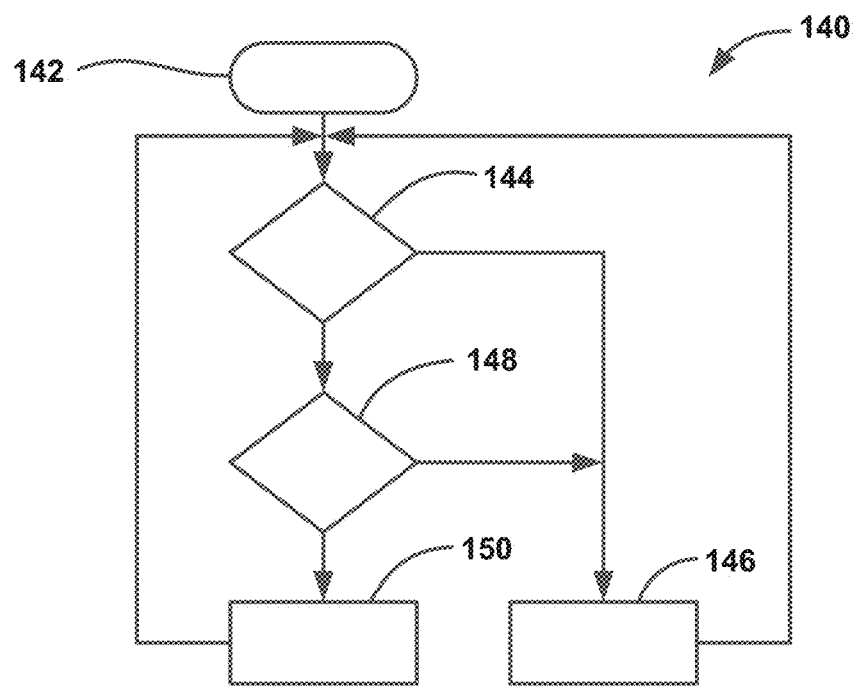
FIG. 6 is a flow diagram showing a process for using GPS signals or range data for measuring vehicle longitudinal speed.

FIG. 6 is a flow chart diagram 140 showing a process for using the GPS data and/or the radar data if it is available to help determine estimated vehicle speed. The algorithm starts at box 142 and determines if new GPS data or radar data is available at decision diamond 144. If new GPS or radar data is not available at the decision diamond 144, then the algorithm uses the predicted vehicle speed from the IMU data at box 146 as discussed above. If new GPS signal or radar data is available at the decision diamond 144, the algorithm determines whether the signal reception is good enough or whether radar static objects exist at decision diamond 148. If the GPS signal reception is not satisfactory or radar static objects do not exist at the decision diamond 148, then the algorithm proceeds to the box 146 to use the vehicle prediction speed data. If the GPS signal is good or the radar sensors are picking up static objects at the decision diamond 148, then the algorithm uses one or both of those values at box 150 to remove errors from the predicted vehicle speed signal. The Kalman-Bucy filtering based correction provided by the box 150 is provided as an error correction at the box 68.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a redundant estimation of speed of a mobile platform, said method comprising:

providing sensor output signals from a plurality of primary sensors;
providing inertial measurement signals from an inertial measurement unit;
estimating the speed in a primary module using the primary sensor signals;
buffering estimated speed values from the primary module for a predetermined period of time;
providing range sensor information from the mobile platform to detected static objects;
determining that one or more of the primary sensors or the primary module has failed; and
estimating the speed in a secondary module using the buffered speed values and the inertial measurement signals if the primary sensors or the primary module has failed, including using the range sensor information to improve the estimation of the speed in the secondary module.

2. The method according to claim 1 wherein providing sensor output signals includes providing sensor output signals from wheel speed sensors, a steering angle sensor, a yaw rate sensor or a longitudinal acceleration sensor.

3. The method according to claim 1 wherein providing inertial measurement signals from an inertial measurement unit includes providing inertial measurement signals from a 6 degree-of-freedom inertial measurement unit including three acceleration values including lateral, longitudinal and up/down acceleration values and three angular rate values including roll, pitch and yaw values.

4. The method according to claim 1 further comprising providing GPS signals identifying the location of the mobile platform, wherein estimating the speed in a secondary module includes using mobile platform location data from the GPS signals to improve the estimation of the speed.

5. A system for providing a redundant estimation of vehicle speed, said system comprising:
a plurality of primary sensors providing sensor output signals;
an inertial measurement unit providing inertial measurement signals;
primary means for estimating the vehicle speed using the primary sensor signals;
means for buffering estimated vehicle speed values for a predetermined period of time;
means for determining that one or more of the primary sensors or the primary means has failed; and
secondary means for estimating the vehicle speed in a secondary module using the buffered vehicle speed values and the inertial measurement signals.

6. The method according to claim 1 wherein estimating the speed in a secondary module includes using kinematics in a body frame.

7. The method according to claim 6 wherein using kinematics in a body frame includes using the equation:

$$\dot{v}^b = -\Omega v^b + R_a^b g^a + f^b,$$

where $v^b$ is velocity at a center of the inertial measurement unit in the body frame b, which corresponds to longitudinal, lateral and up/down speed, i.e., $v^b=[v_{lon}, v_{lat}, v_{up}]^T$, where it is assumed that the mobile platform always touches the ground, particularly a "virtual" measurement $v_{up}=0$ in Kalman filtering; $\Omega$ is a skew symmetric matrix of angular velocity $\omega$ in the b-frame; $g^a$ is the Earth gravitational vector in the inertia frame a, specifically $(0,0,-9.80665)^T$ m/s²; $R_a^b$ is a rotation matrix from the b-frame to an inertia frame a; $f^b$ is acceleration in the b-frame, and $\omega$ is angular rates in the b-frame, and where the skew matrix $\Omega$ is:

$$\Omega = [\omega \times] = \begin{pmatrix} 0 & -\dot{\psi} & \dot{\theta} \\ \dot{\psi} & 0 & -\dot{\phi} \\ -\dot{\theta} & \dot{\phi} & 0 \end{pmatrix},$$

and the angular rates $\omega$ are:

$$\omega = (\dot{\phi}, \dot{\theta}, \dot{\psi})^T,$$

and where $\phi$ is roll angle, $\theta$ is pitch angle and $\psi$ is yaw angle.

8. The method according to claim 6 wherein estimating the speed in the secondary module includes removing data from the inertial measurement signals of platform motion in an up/down direction.

9. The method according to claim 6 wherein estimating the speed in the secondary module includes removing yaw data from the inertial measurement signals.

10. The method according to claim 1 wherein the predetermined period of time is five seconds.

11. The method according to claim 1 wherein the mobile platform is a vehicle.

12. A method for providing a redundant estimation of vehicle speed, said method comprising:
providing sensor output signals from a plurality of primary sensors;
providing inertial measurement signals from a 6 degree-of-freedom inertial measurement unit including three acceleration values including lateral, longitudinal and up/down acceleration values and three angular rate values including roll, pitch and yaw values;
providing GPS signals identifying the location of the vehicle;
providing range sensor information from the vehicle to detected static objects;
estimating the vehicle speed in a primary module using the primary sensor signals;
buffering the estimated vehicle speed values from the primary module for a predetermined period of time;
determining that one or more of the primary sensors or the primary module has failed; and
estimating the vehicle speed in a secondary module using the buffered vehicle speed values and the inertial measurement signals including using vehicle location data from the GPS signals and the range sensor information to improve the estimation of the vehicle speed.

13. The method according to claim 12 wherein providing sensor output signals includes providing sensor output signals from wheel speed sensors, a steering angle sensor, a yaw rate sensor or a longitudinal acceleration sensor.

14. The method according to claim 12 wherein estimating the vehicle speed in a secondary module includes using vehicle kinematics in a vehicle body frame.

15. The method according to claim 14 wherein using vehicle kinematics in a vehicle body frame includes using the equation:

$$\dot{v}^b = -\Omega v^b + R_a^b g^a + f^b,$$

where $v^b$ is vehicle velocity at a center of the inertial measurement unit in the vehicle body frame b, which corresponds to vehicle longitudinal, lateral and up/down speed, i.e. $v^b=[v_{lon}, v_{lat}, v_{up}]^T$, where it is assumed that wheels of the vehicle always touch the ground, particularly a "virtual" measurement $v_{up}=0$ in Kalman filtering; $\Omega$ is a skew symmetric matrix of angular velocity $\omega$ in the b-frame; $g^a$ is the Earth gravitational vector in an inertia frame a, specifically $(0,0,-9.80665)^T$ m/s²; $R_a^b$ is a rotation matrix from the b-frame to the inertia frame a; $f^b$ is acceleration in the b-frame, and $\omega$ is angular rates in the b-frame, and where the skew matrix $\Omega$ is:

$$\Omega = [\omega \ x] = \begin{pmatrix} 0 & -\dot{\psi} & \dot{\theta} \\ \dot{\psi} & 0 & -\dot{\phi} \\ -\dot{\theta} & \dot{\phi} & 0 \end{pmatrix},$$

and the angular rates $\omega$ are:

$\omega = (\dot{\phi}, \dot{\theta}, \dot{\psi})^T,$ and where $\phi$ is roll angle, $\theta$ is pitch angle and $\psi$ is yaw angle.

16. The method according to claim 14 wherein estimating the vehicle speed in the secondary module includes removing data from the inertial measurement signals of vehicle motion in the up/down direction.

17. The method according to claim 14 wherein estimating the vehicle speed in the secondary module includes removing yaw data from the inertial measurement signals.

18. The system according to claim 5 further a GPS receiver for providing GPS signals identifying the location of the vehicle and a range sensor providing range information from the vehicle to detected static objects, wherein the means for estimating the speed in a secondary module includes using location data from the GPS signals and the range sensor information to improve the estimation of the speed.

19. The system according to claim 5 wherein the inertial measurement unit is a 6 degree-of-freedom inertial measurement unit that provides three acceleration values including lateral, longitudinal and up/down acceleration values and three angular rate values including roll, pitch and yaw values.

* * * * *